(12) United States Patent
Kalafut et al.

(10) Patent No.: US 6,744,406 B2
(45) Date of Patent: Jun. 1, 2004

(54) DETERMINING DESIRED PSEUDOLITE LOCATIONS BASED ON PREDICTED GPS COVERAGE

(75) Inventors: James J. Kalafut, Peoria, IL (US); William E. Allen, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/024,413

(22) Filed: Dec. 18, 2001

(65) Prior Publication Data

US 2003/0112181 A1 Jun. 19, 2003

(51) Int. Cl.$^7$ .............................. G01S 1/08; H04B 7/185
(52) U.S. Cl. .............. 342/386; 342/357.02; 342/357.06
(58) Field of Search ........................... 342/386, 357.02, 342/357.06, 357.09

(56) References Cited

U.S. PATENT DOCUMENTS

| | | |
|---|---|---|
| 5,375,059 A | 12/1994 | Kyrtsos et al. |
| 5,430,657 A | 7/1995 | Kyrtsos |
| 6,188,353 B1 | 2/2001 | Mitchell |
| 6,201,497 B1 | 3/2001 | Snyder et al. |

OTHER PUBLICATIONS

The use of pseudo–satellites for improving GPS performance, D. Klein et al., Navigation: Journal of the Institute of Navigation, vol. 31(4), Winter 1984–1985.*

Precise positioning with GPS near obstructions by augmentation with pseudolitees, J.M. Stone et al., IEEE Position Location an Navigation Symposium, Apr. 20–23, 1998.*

Integration of GNSS and Pseudo–Satellites: New Concepts for Precise Positioning, J. Wang et al., IAG Scientific Assembly, Sep. 2–7, 2001.*

Pseusolite–based inverted positioning and its applications, L. Dai et al., 5th Int. Symp. on Satellite Navigation Technology & Applications, Jul. 24–27, 2001.*

Optimal locations of pseudolites for differential GPS, B.W. Parkinson et al., Navigation: Journal of the Institute of Navigation, vol. 33(4), Winter 1986–1987.*

GPS Pseudolites: Theory, Design, and Applications, H.S. Cobb, Ph.D. Thesis, Dept. of Aeronautics and Astronautics, Stanford University, p. 28–37, 124–126, Sep. 1997.*

* cited by examiner

Primary Examiner—Thomas H. Tarcza
Assistant Examiner—Fred H Mull
(74) Attorney, Agent, or Firm—Steve D Lundquist; Robin S Fahlberg

(57) ABSTRACT

A method and apparatus for determining a desired position of a pseudolite at a site. The method and apparatus includes predicting an area of coverage of the site by at least one GPS satellite, determining a condition of reduced coverage as a function of the predicted area of coverage, displaying the area having reduced coverage on a terrain map, and placing a pseudolite at a location at the site to provide coverage in the area having reduced coverage.

12 Claims, 10 Drawing Sheets

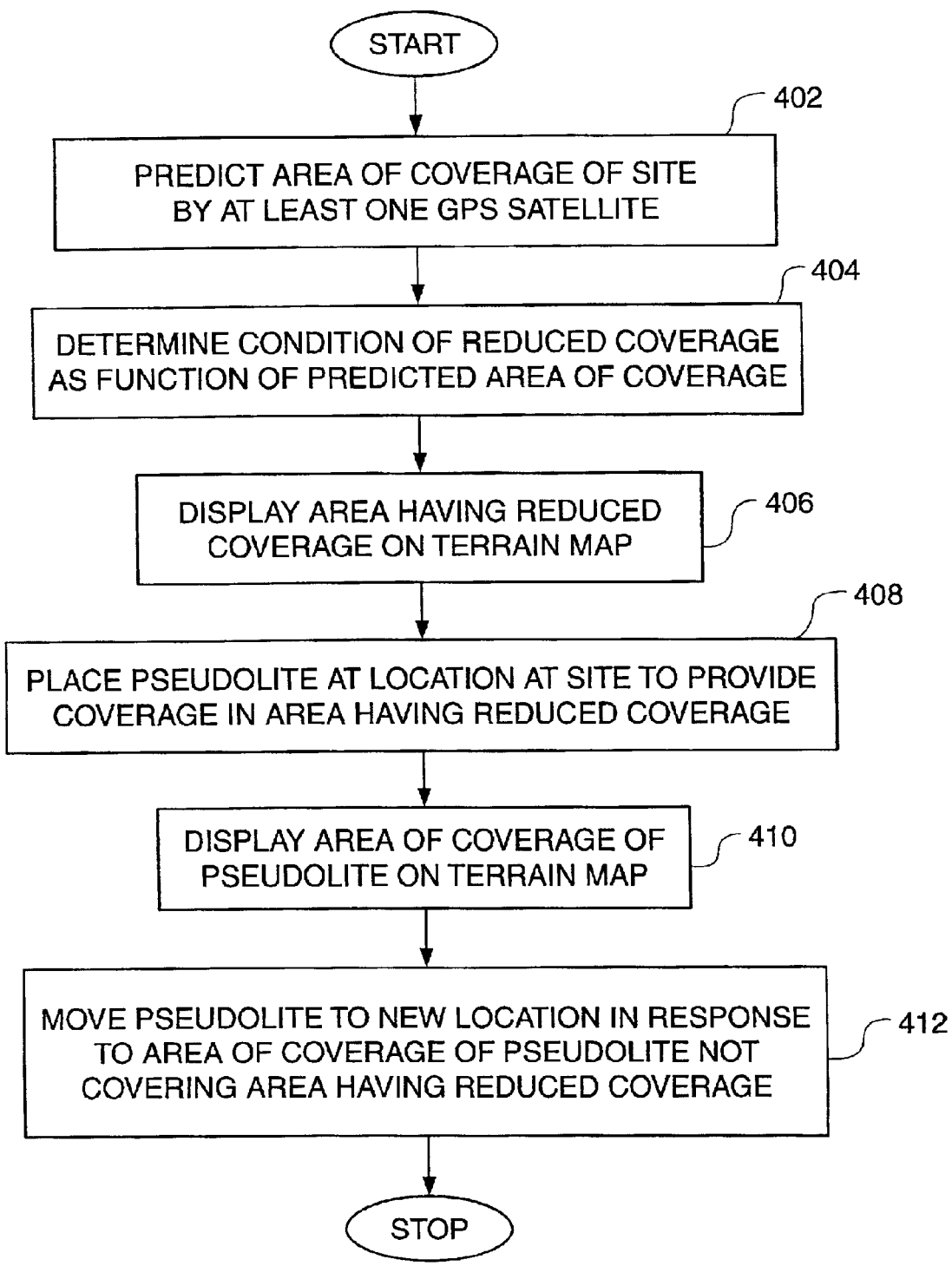

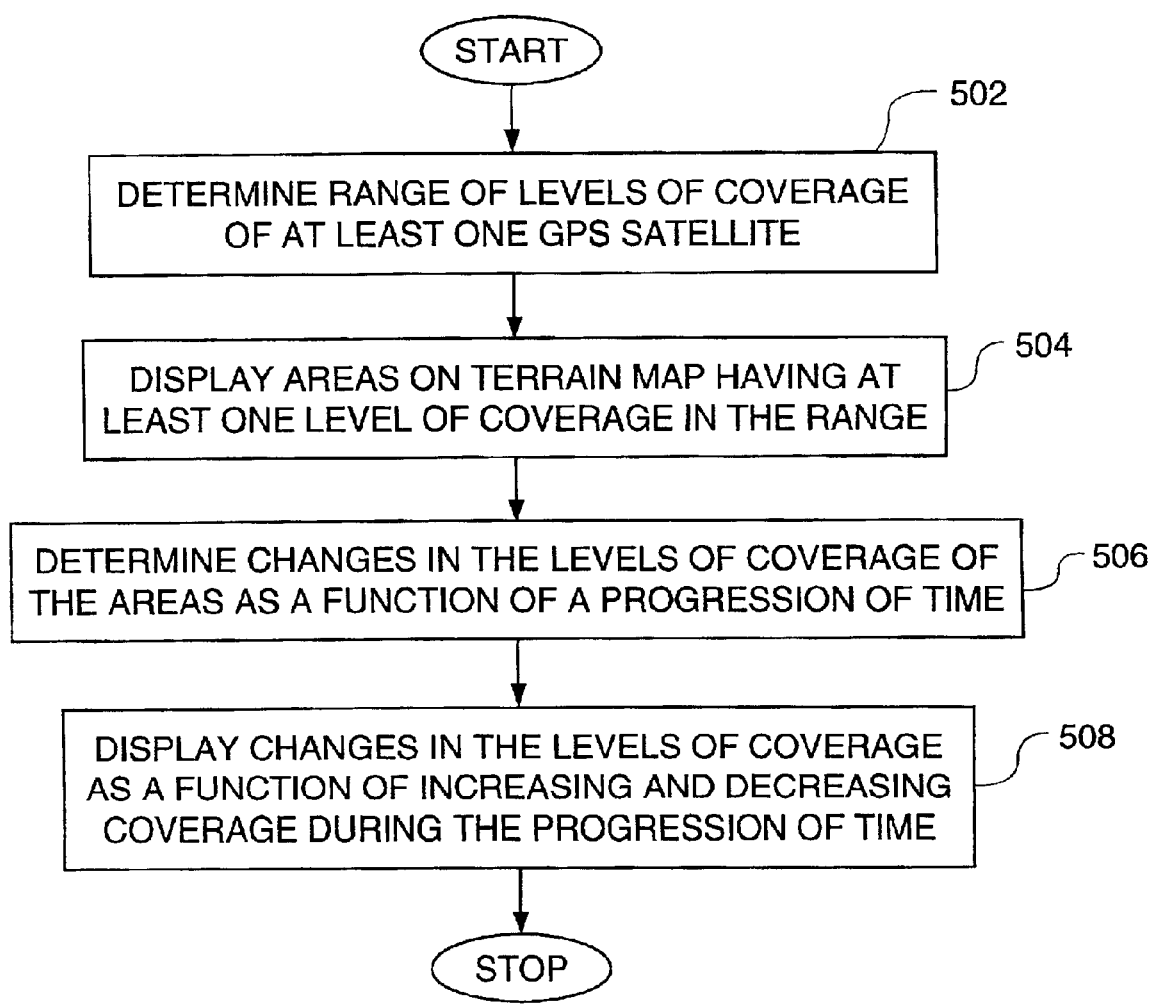

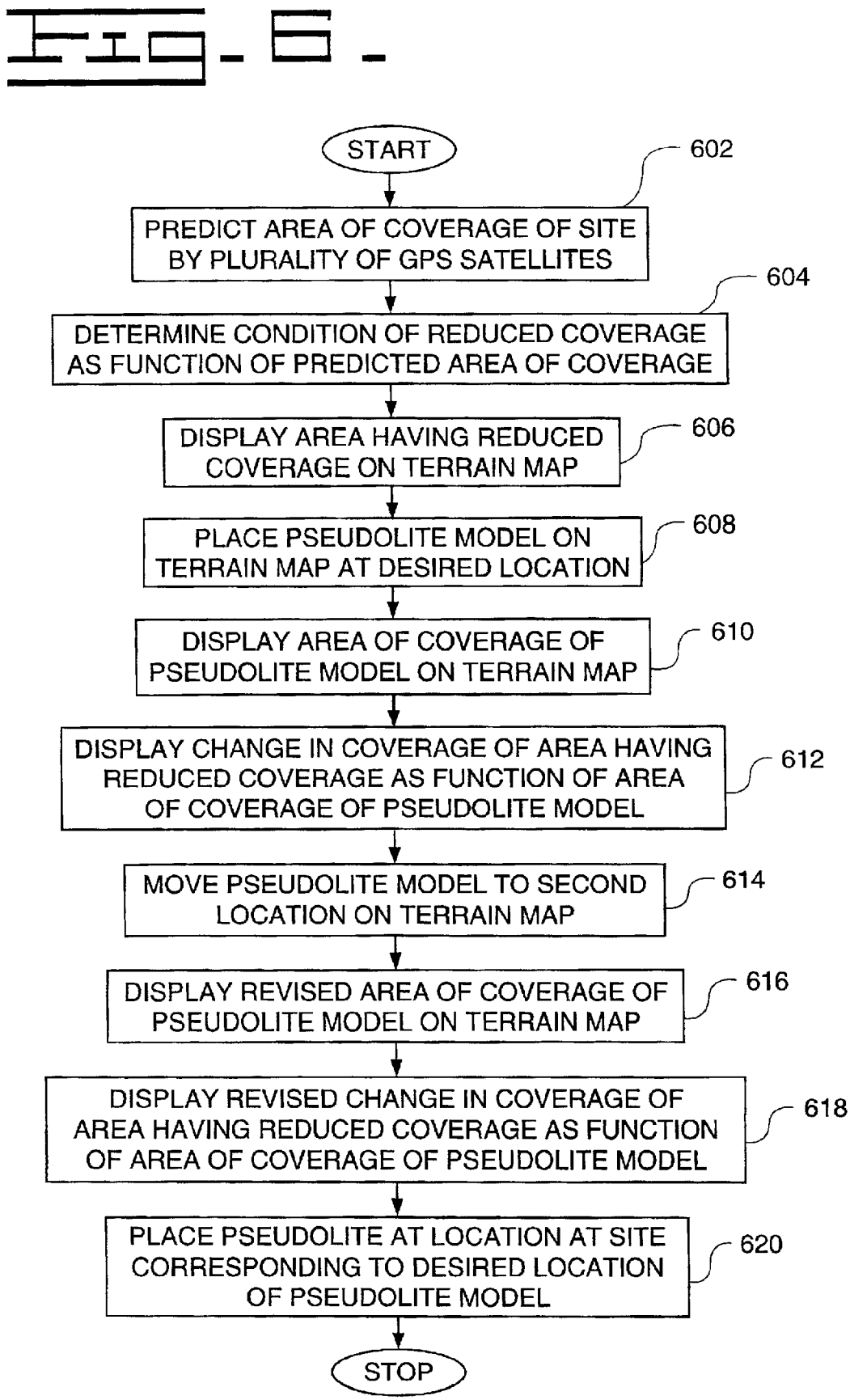

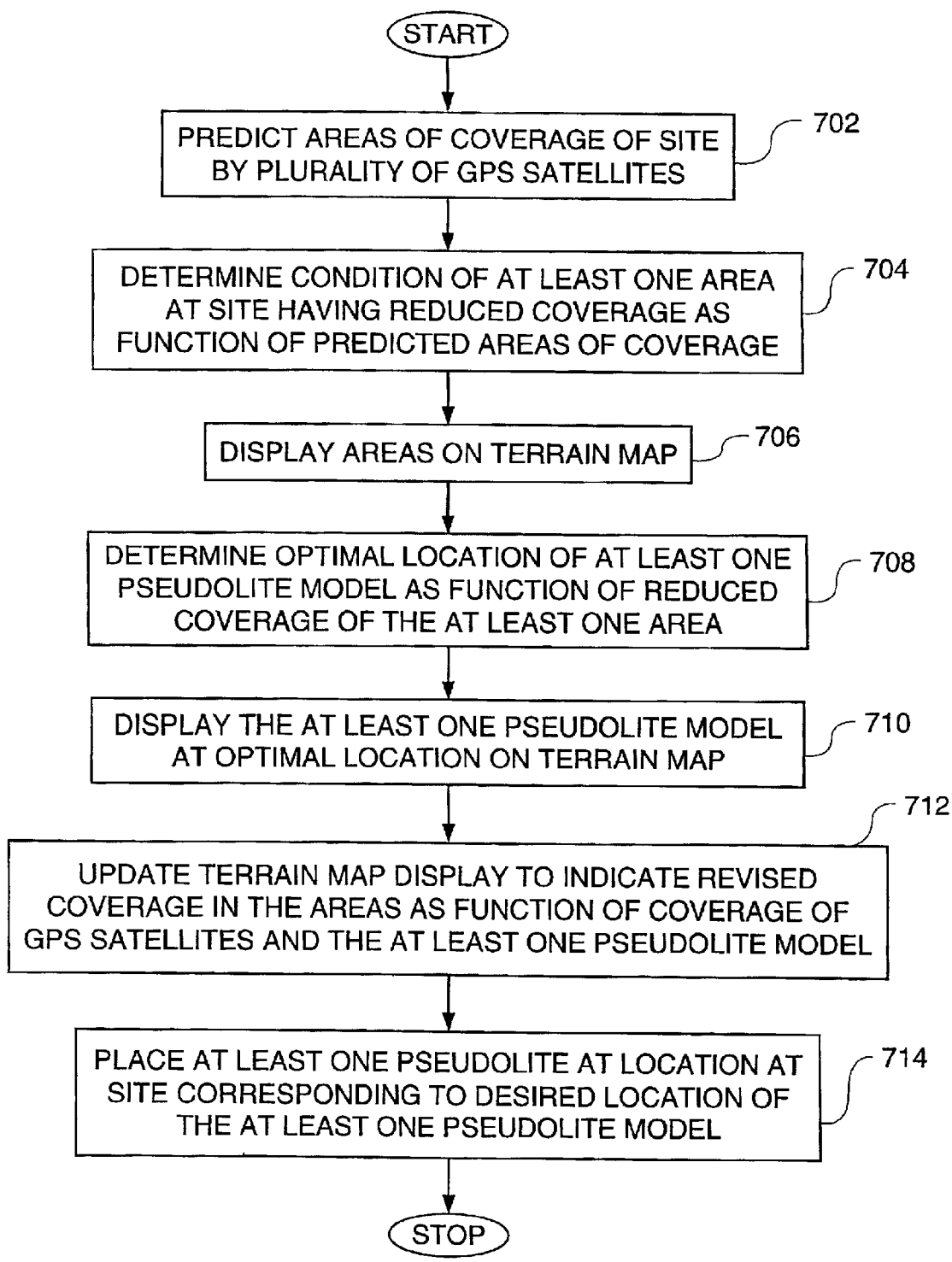

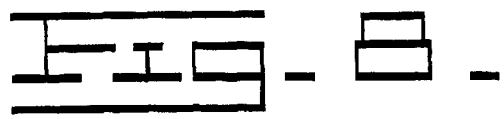
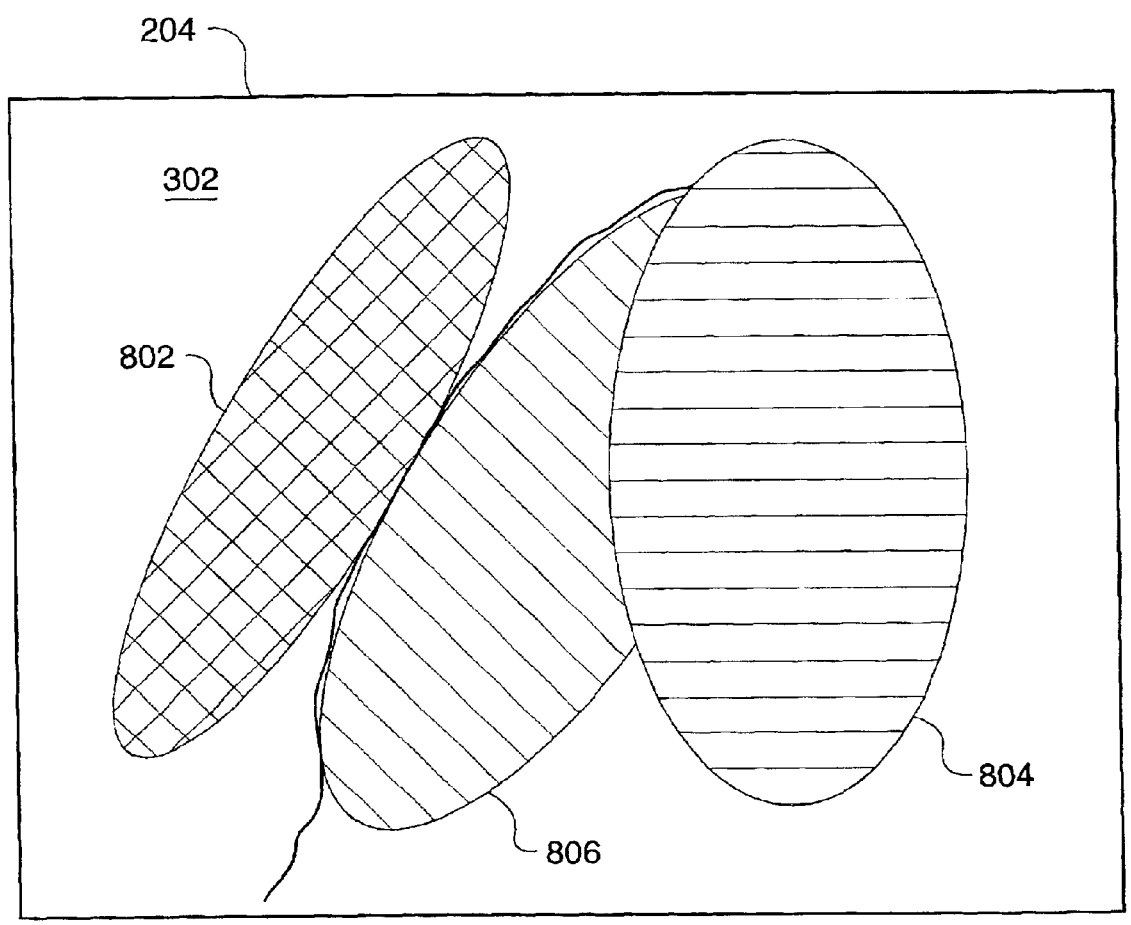

DETERMINING DESIRED PSEUDOLITE LOCATIONS BASED ON PREDICTED GPS COVERAGE

TECHNICAL FIELD

This invention relates generally to a method and apparatus for predicting future coverage of GPS satellites and, more particularly, to a method and apparatus for determining optimal placements of pseudolites as a function of predicted future coverage of GPS satellites.

BACKGROUND

Global Positioning Satellite (GPS) systems are used extensively in tracking and monitoring the locations of a wide variety of moving objects. For example, open pit mining operations commonly use GPS to track the locations and movements of various earthworking machines, and mobile machines which provide support functions, e.g., servicing, transportation, and the like. In such mining operations, machines such as excavators, wheel loaders, track-type tractors, and the like, perform earthworking tasks such as digging, loading, leveling, and such. Other machines, such as off-road mining trucks, perform other tasks such as hauling. The complex interactions of these machines has resulted in a great need to track and monitor their activities, and GPS has become increasingly depended upon to perform this monitoring.

It is widely known that GPS involves the use of a number of satellites which orbit the earth in known, non-geosynchronous orbits. For example, the system used by the United States, i.e., NAVSTAR, uses twenty-four (24) satellites, which are spaced apart in various orbits. For many applications, at least three (3), and preferably at least four (4), satellites are in line-of-sight view by a GPS antenna and receiver located on the surface of the planet, thus providing the GPS receiver with the needed data for position determination.

However, situations exist in which some GPS satellites are obscured from view, thus not allowing the minimum number of satellites to be used. In these situations, GPS systems cannot function as desired, and position determination may not be possible. For example, in the open pit mining operation noted above, the rugged terrain, e.g., cliff faces, deep pit areas, and the like, may obscure satellites from view and prevent GPS from being used effectively.

A technique which has been developed to counter the above situation is to place false GPS satellites, known as pseudolites, at strategic earth-bound locations to compensate for the lack of true GPS satellite information. These pseudolites function in the same manner as true GPS satellites, providing a signal similar to GPS signals to further enable position determination. Typically, the pseudolites are placed in areas in which problems with GPS coverage have been known to occur, and thus are used to overcome a situation which has already been determined to exist.

Currently, there are no known means disclosed in the art which take advantage of the ability to predict the future location of GPS satellites to determine future GPS coverage over an area at a site based on terrain data, and subsequently provide a means to compensate for inadequacies in GPS coverage prior to problems actually occurring.

The present invention is directed to overcoming one or more of the problems as set forth above.

SUMMARY OF THE INVENTION

In one aspect of the present invention a method for determining a desired position of a pseudolite at a site is disclosed. The method includes the steps of predicting an area of coverage of the site by at least one GPS satellite, determining a condition of reduced coverage as a function of the predicted area of coverage, displaying the area having reduced coverage on a terrain map, and placing a pseudolite at a location at the site to provide coverage in the area having reduced coverage.

In another aspect of the present invention a method for determining a desired position of a pseudolite at a site is disclosed. The method includes the steps of predicting an area of coverage of the site by a plurality of GPS satellites, determining a condition of reduced coverage as a function of the predicted area of coverage, displaying the area having reduced coverage on a terrain map, placing a pseudolite model on the terrain map at a desired location, displaying an area of coverage of the pseudolite model on the terrain map, and displaying a change in coverage of the area having reduced coverage as a function of the area of coverage of the pseudolite model.

In yet another aspect of the present invention a computer-based method for determining a desired position of a pseudolite at a site is disclosed. The method includes the steps of predicting areas of coverage of the site by a plurality of GPS satellites, determining a condition of at least one area at the site having reduced coverage as a function of the predicted areas of coverage, displaying the areas on a terrain map, the displayed areas indicating a level of coverage, determining an optimal location of at least one pseudolite model as a function of reduced coverage of the at least one area, displaying the at least one pseudolite model at the optimal location on the terrain map, and updating the terrain map display to indicate revised coverage in the areas as a function of the coverage of the GPS satellites and the at least one pseudolite model.

In yet another aspect of the present invention an apparatus for determining a desired position of a pseudolite at a site is disclosed. The apparatus includes at least one mobile machine located at the site, a GPS receiver located on the mobile machine for receiving signals from a plurality of GPS satellites, a display for indicating a terrain map of the site, and a processor. The processor is adapted to predict a future area of coverage of the site by the plurality of GPS satellites, determine a condition of predicted reduced coverage in at least one area of the site, and provide information to the display to indicate the at least one area having reduced coverage, the area having reduced coverage being indicative of a desired position of a pseudolite at the site.

BRIEF DESCRIPTION OF THE DRAWINGS

FIG. 4 is a flow chart illustrating a first aspect of a preferred method of the present invention;

FIG. 5 is a flow chart illustrating a second aspect of a preferred embodiment of the present invention;

FIG. 6 is a flow chart illustrating a third aspect of a preferred embodiment of the present invention;

FIG. 7 is a flow chart illustrating a fourth aspect of a preferred embodiment of the present invention;

FIG. 8 is a diagrammatic illustration of a display depicting another aspect of the present invention;

DETAILED DESCRIPTION

Figure 1:
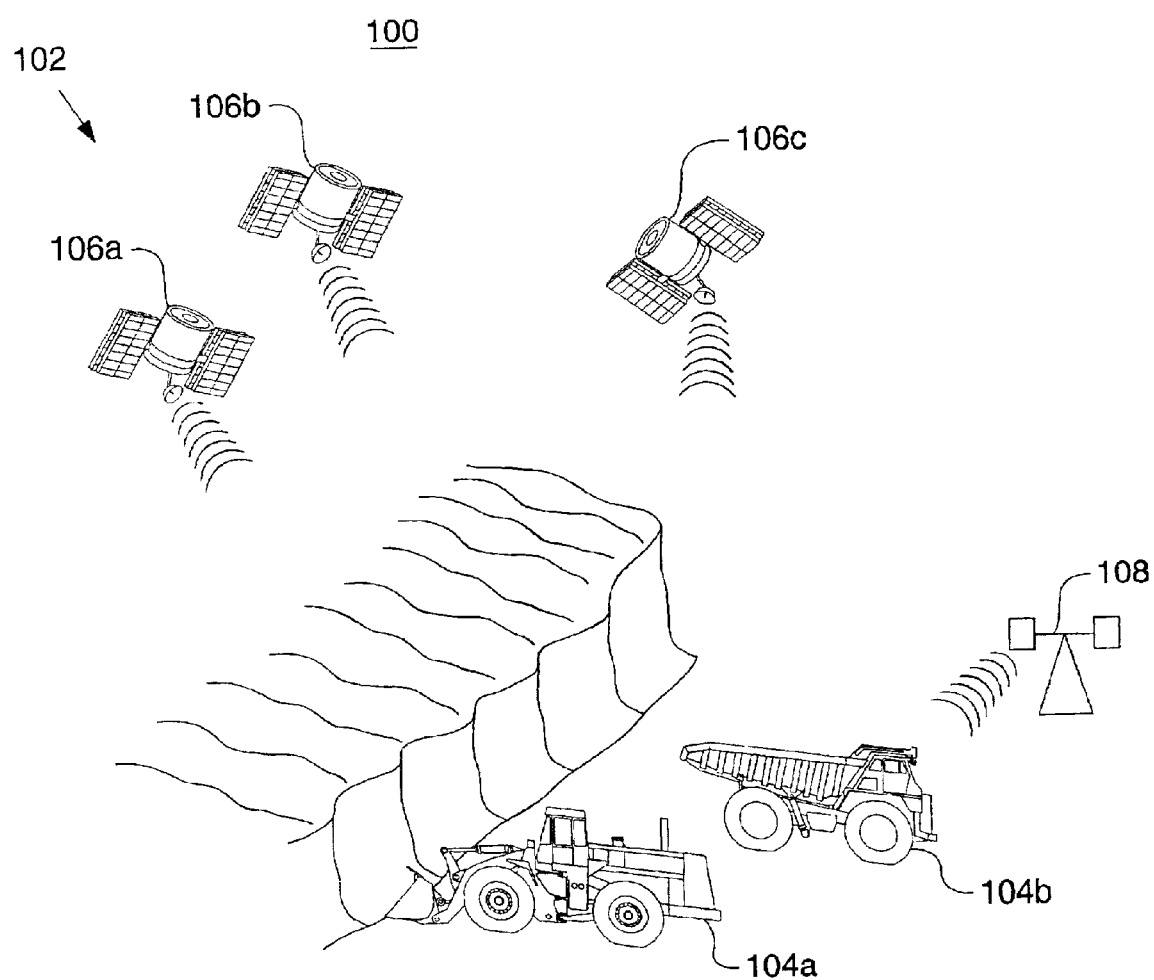
FIG. 1 is a diagrammatic illustration of a site having mobile machines.

Referring to the drawings and the appended claims, a method and apparatus 100 for determining a desired position of a pseudolite 108 at a site 102 is shown.

Referring to FIG. 1, a site 102 is shown in which a mobile machine 104 is being used to perform some work function. More specifically, the site 102 is depicted as an open pit mining site, and two mobile machines are illustrated. A first mobile machine 104a performs digging and loading operations and a second mobile machine 104b performs hauling operations. It is noted that the depiction of a mining site and mine-related mobile machines are for exemplary purposes only. Other types of sites, e.g., construction sites, warehouse sites, manufacturing sites, urban areas, and the like, may benefit from the present invention as well. Furthermore, other types of mobile machines suitable for use at other types of sites may also be used. For example, utility and service vehicles in an urban environment may be used with the present invention.

A plurality of GPS satellites 106, three of which are shown in FIG. 1, orbit the earth. For example, NAVSTAR, a well known system for GPS position determination, includes twenty-four (24) satellites orbiting at various non-geosynchronous positions. The satellites are positioned such that at least three satellites, and preferably at least four, are in direct line-of-sight view from a point on the earth at all times. The need for a direct view of at least three satellites is to allow position determining using techniques which are well known in the art.

Difficulties arise, however, in areas in which the view of satellites is obstructed. For example, in FIG. 1 it may be assumed that a first GPS satellite 106a, and perhaps a second GPS satellite 106b are obstructed from view by the mobile machines 104a,b due to the terrain at the site 102. Extending this assumption further, the only remaining satellite in view is a third GPS satellite 106c. Therefore, not enough satellites are in view to allow position determination by the mobile machines 104.

A pseudolite 108 is positioned at the site 102 to compensate for the obstruction of view of one or more GPS satellites 106. Although only one pseudolite 108 is shown, additional pseudolites may be used. The use of pseudolites is well known in the art and need not be described further.

Figure 2:
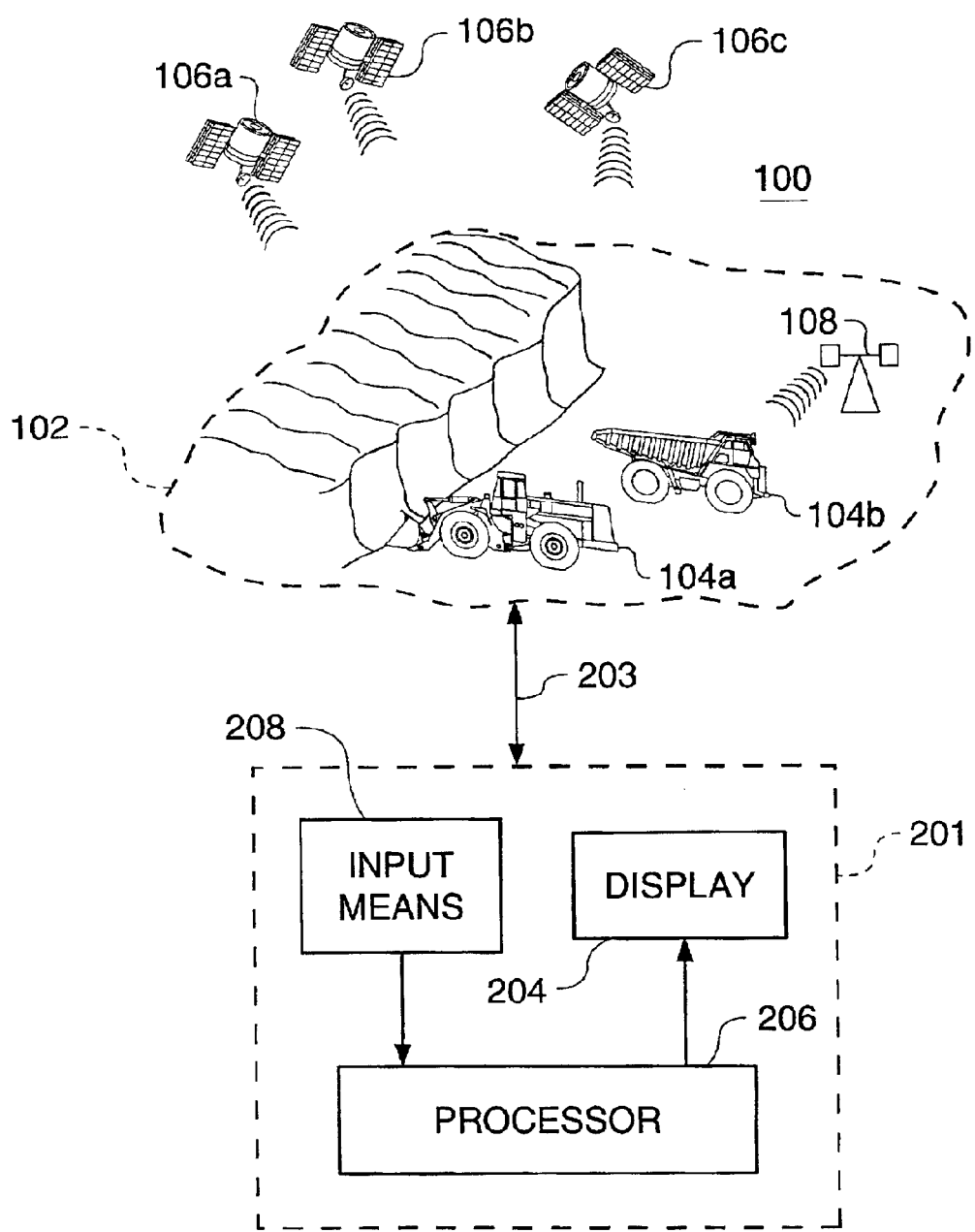
FIG. 2 is a block diagram illustrating a preferred embodiment of the present invention.

Referring to FIG. 2, a block diagram illustrating a preferred embodiment of the present invention is shown. A remote site 201 provides a location for receiving periodic updated information regarding the present and predicted locations of one or more GPS satellites 106, for receiving terrain map information regarding one or more sites 102 of interest, and for receiving information from the relevant sites 102 regarding operations at the site 102, e.g., in which locations work operations will be performed at desired future times. The remote site 201 may be located at a site 102, or may be located at any other desired location. For example, a remote site 201 may be located at an office site many miles from the nearest site 102, the office site providing work space for planners of operations of the sites 102.

Preferably, the remote site 201 includes at least one processor 206 suitable for receiving the above information and providing desired information, as described below. The processor includes a display 204 for providing a graphical view of a terrain map 302 of the site 102, including current and predicted coverage of at least one GPS satellite 106. Furthermore, input means 208 are provided to allow an operator to input information. The input means 208 may be any of a variety of types, for example, keyboard, touch pad, touch screen, light pen, and such.

In the preferred embodiment, the desired information, e.g., optimal locations of at least one pseudolite 108 at the site 102 during any desired time period in which GPS coverage is sub-optimal, is delivered to the site 102 by one or more conventional means 203 for delivery, such as electronic link, hand delivery, mail delivery, and the like.

Figure 10:
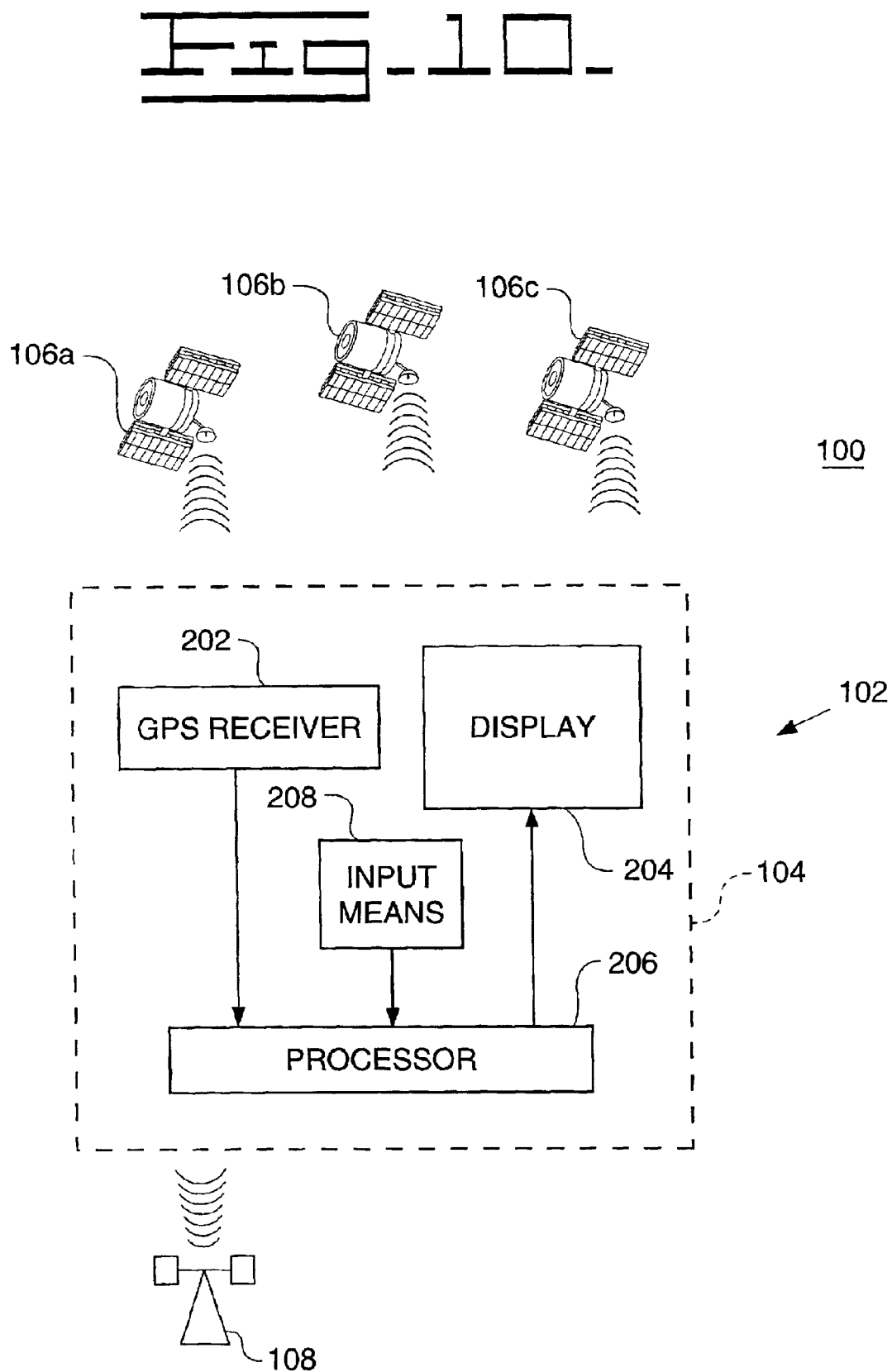
FIG. 10 is a block diagram illustrating an alternate embodiment of the present invention.

Referring to FIG. 10, a block diagram illustrating an alternate embodiment of the present invention is shown. A variety of equipment, described in more detail below, is located on a mobile machine 104. The mobile machine 104 may be one or both of the mobile machines 104a,b shown in FIG. 1. More particularly, the mobile machine 104 may be any mobile machine 104 which uses position determining equipment incorporating GPS positioning techniques.

A GPS receiver 202, located on the mobile machine 104, receives signals from the GPS satellites 106. The GPS information is delivered to a processor 206. The processor 206 may also receive information from one or more pseudolites 108. For example, the signal from the pseudolite 108 may also be received by the GPS receiver 202, and the information relayed to the processor 206. Alternatively, the signal from the pseudolite 108 may be received by a separate receiver (not shown) and then delivered to the processor 206.

A display 204 receives information from the processor 206 and responsively displays information in graphical or textual format, or both. Preferably, the display 204 receives information from the processor 206 pertaining to the terrain at the site 102, and displays a terrain map 302. In addition, the display 204 receives information relevant to the signals received by the GPS satellites 106 and the pseudolite 108 and indicates areas of coverage of each, as is described in more detail below.

An input means 208 allows inputting of information to the processor 206. For example, referring to FIG. 3, the input means 208 allows inputting a desired location on the terrain map 302 for a pseudolite model 304. The input means 208 may be any of a variety of types, for example, keyboard, touch pad, touch screen, light pen, and such.

Referring to FIG. 4, a flow diagram illustrating a first embodiment of the present invention is shown. Continued reference is made to FIGS. 1–3.

In a first control block 402, an area of coverage of the site 102 by at least one GPS satellite 106 is predicted. Preferably, an area of coverage by each GPS satellite potentially in view of the site 102 is predicted. It is well known in the art that the position and orbit of each GPS satellite is known both at a present time and at any time many months into the future. Updated data regarding the positions of satellites is periodically issued by the United States Government to enable the determination of the position of any given GPS satellite at any desired time. Using this issued data and terrain map information commonly available, it is possible to determine, i.e., predict, an area of coverage at a site of a GPS satellite at a desired future time or time interval.

In a second control block 404, a condition of reduced coverage as a function of the predicted area of coverage is determined. The condition of reduced coverage may exist, for example, when the GPS satellite 106 is in line with obstructions such as cliff sides, tall buildings, trees, and the like. The reduced coverage condition may exist for a temporary period of time; that is, until the GPS satellite 106 moves out of the line of sight of the obstruction. Therefore, the determination of a reduced coverage condition also includes a determination of a period of time of reduced coverage.

Figure 3:
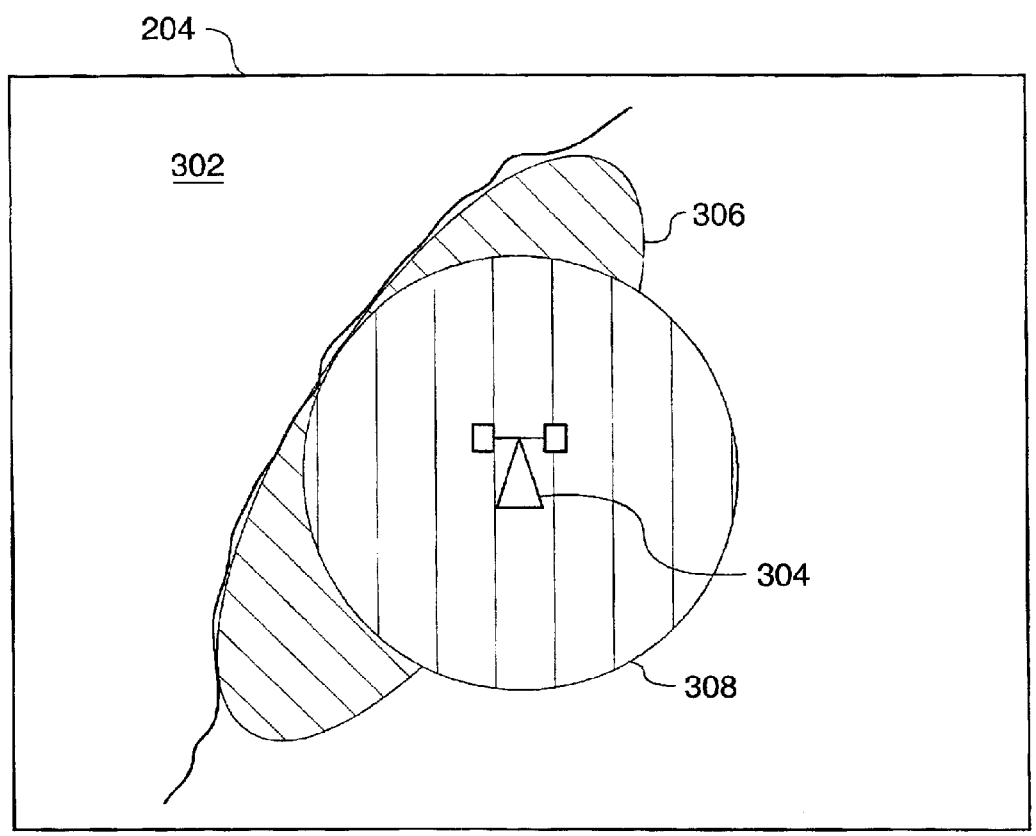
FIG. 3 is a diagrammatic illustration of a display depicting one aspect of the present invention.

In a third control block 406, the area having reduced coverage is displayed on the terrain map 302, shown in FIG. 3 as an area 306 having reduced coverage. It is noted that the graphical depictions in FIG. 3 are for illustrative purposes only. A typical terrain map display including the area 306 having reduced coverage would normally be more complex and irregular. Although FIG. 3 does not indicate, icons of mobile machines 104 may also be shown to display the locations of the mobile machines 104 relative to the area 306 having reduced coverage. It is also not shown in FIG. 3, but areas of GPS satellites 106 having normal coverage may also be shown for reference purposes.

In a fourth control block 408, a pseudolite 108 is placed at a location at the site 102 to provide coverage in the area 306 having reduced coverage. It may be desired to place more than one pseudolite 108, for example, several pseudolites 108, as needed. In the preferred embodiment, the pseudolite 108 is placed at a location based on factors such as accessibility, experience, trial-and-error, and the like. If it is determined that the pseudolite 108 in only needed at some future period of time, the pseudolite 108 is placed at the location during that future period of time. Alternatively, the pseudolite 108 is placed at the desired location and activated only during the desired future period of time.

In a fifth control block 410, an area of coverage 308 of the pseudolite 108 is displayed on the terrain map 302. Preferably, a pseudolite model 304 is also displayed.

In a sixth control block 412, the pseudolite 108 is moved to a new location at the site 102 in response to the area of coverage 308 of the pseudolite 108 not adequately covering the area 306 having reduced coverage. This process is repeated until the pseudolite 108 is at the desired location.

Referring to FIG. 5, a flow diagram illustrating another aspect of the present invention is shown.

In a first control block 502, a range of levels of coverage of at least one GPS satellite 106 is determined. For example, for a given time period, a first set of levels of 80% to 100% coverage may be determined, a second set of levels of 60% to 80% coverage maybe determined, and a third set of levels of 40% to 60% coverage may be determined. Any coverage less than 40% may be classified as a fourth level of coverage in the range. The percentage of coverage may be indicative of the amount of time that full coverage is enabled, or may be indicative of a percentage of coverage at a given time with respect to full coverage.

In a second control block 504, areas on the terrain map 302 are displayed which have at least one level of coverage in the range. For example, as shown in FIG. 8, an area 802 having a first level of coverage is shown, an area 804 having a second level of coverage is shown, and an area 806 having a third level of coverage is shown. As noted above, the display 204 of FIG. 8 is simplified for purposes of illustration. The terrain map 302 typically will be shown in detail, the areas 802,804,806 having the first, second, and third levels of coverage will typically be irregular and complex, and additional information, both graphical and text, will be shown.

In a third control block 506, changes in the levels of coverage as a function of time are determined. For example, as GPS satellites move in their orbits, the levels of coverage of each satellite changes over time.

In a fourth control block 508, the changes in the levels of coverage are displayed on the terrain map 302 as a function of increasing and decreasing coverage during the progression of time. The effect on the display may be compared to graphical time progression techniques commonly used in weather forecasts. The time progression display provides a viewer with an effective means to determine problem areas of GPS signal coverage over any period of time of interest.

Referring to FIG. 6, a flow diagram illustrating another embodiment of the present invention is shown.

In a first control block 602, an area of coverage of the site 102 by a plurality of GPS satellites 106 is predicted, as described above. In the preferred embodiment, the predicted area of coverage of each GPS satellite 106 is determined, and the predicted coverages are superimposed to determine the cumulative coverage for the site 102.

In a second control block 604, a condition of reduced coverage is determined as a function of the predicted area of coverage. It is noted that there may be more than one area having reduced coverage, and the level of coverage may differ in those areas.

In a third control block 606, the area having reduced coverage is displayed on the terrain map 302.

In a fourth control block 608, a pseudolite model 304 is placed on the terrain map 302 at a desired location. Preferably, this is accomplished by use of the input means 208. FIG. 3 illustrates an example of a pseudolite model 304 on the terrain map 302.

In a fifth control block 610, an area of coverage 308 of the pseudolite model 304 is displayed on the terrain map 302.

In a sixth control block 612, a change in coverage of the area 306 having reduced coverage is displayed as a function of the area of coverage 308 of the pseudolite model 304. FIG. 3, in simplified form, illustrates the area of coverage 308 of the pseudolite model 304 superimposed over the area 306 of reduced coverage. However, other means for indicating the change in coverage may be used. For example, the intersecting portion of the two areas may be shown differently from either area alone. Furthermore, the change in the area of coverage may be indicated in accord with a level of coverage, for example, as one of the defined levels in the range described above.

In a seventh control block 614, the pseudolite model 304 is moved to a second location on the terrain map 302. Control then proceeds to an eighth control block 616, in which a revised area of coverage 308 of the pseudolite model 304 is displayed on the terrain map 302. Then, in a ninth control block 618, a revised change in coverage of the area 306 having reduced coverage is displayed as a function of the revised area of coverage 308 of the pseudolite model 304. The processes of the seventh, eighth, and ninth control blocks 614,616,618 are continued until a desired location for the pseudolite model 304 is chosen.

In a tenth control block 620, a pseudolite 108 is placed at the location at the site 102 corresponding to the desired location of the pseudolite model 304. Using this embodiment, the pseudolite model 304, rather than the pseudolite 108, is moved about until an optimal location is found.

Referring to FIG. 7, a flow diagram illustrating yet another embodiment of the present invention is shown.

In a first control block 702, areas of coverage of the site 102 by a plurality of GPS satellites 106 are predicted.

In a second control block 704, a condition is determined of at least one area at the site 102 having reduced coverage as a function of the predicted areas of coverage.

In a third control block 706, the predicted areas of coverage are displayed on the terrain map 302. Preferably, the predicted areas of coverage are displayed to indicate a level of coverage.

In a fourth control block 708, an optimal location of at least one pseudolite model 304 is determined as a function of reduced coverage of the at least one area having reduced coverage. Preferably, the optimal location is determined by the processor 206, using software which determines the location of the pseudolite model 304 such that the area of coverage of the pseudolite model 304 optimally compensates for the area having reduced coverage.

In a fifth control block 710, the pseudolite model 304 is displayed at the optimal location on the terrain map 302. In the preferred embodiment, the optimal location is shown in terms which allows placement of a pseudolite 108 at the location at the site 102, e.g., in geographical coordinates.

In a sixth control block 712, the terrain map display is updated to indicate a revised coverage in the areas as a function of coverage of the GPS satellites 106 and coverage of the pseudolite model 304.

In a seventh control block 714, a pseudolite 108 is placed at the location at the site 102 corresponding to the optimal, i.e., desired, location of the pseudolite model 304. An additional pseudolite 108 is placed at the site 102 for each additional pseudolite model 304.

INDUSTRIAL APPLICABILITY

Figure 9:
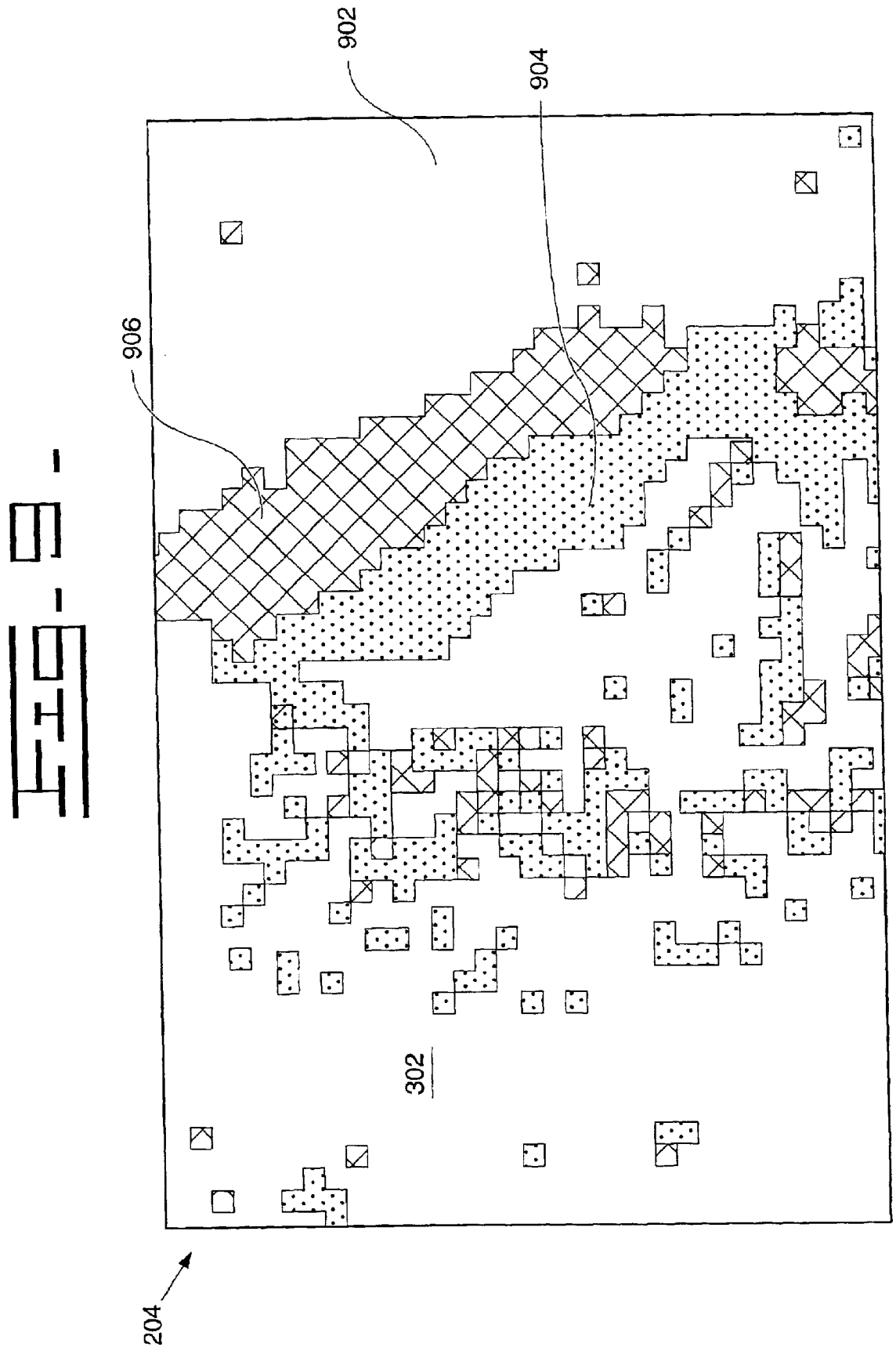
FIG. 9 is a diagrammatic illustration of a display depicting yet another aspect of the present invention.

As an example of an application of the present invention, reference is made to FIG. 9. In FIG. 9, an exemplary display is illustrated of a terrain map 302 at a site 102. The display 204 is more complex and irregular than the displays shown in FIGS. 3 and 8 so that a more representative sample may be presented.

The terrain map 302 is shown to illustrate areas at the site 102 which have certain numbers of GPS satellites 106 visible, i.e., in view of the site 102. For example, a first area 902, shown as a first pattern, may have seven or more GPS satellites 106 visible. The first area 902 is not necessarily clustered in one location, but may be scattered throughout the site 102. In this manner, the first area 902 is not particularly representative of a geographical area, but represents more specifically all those geographical areas which are in view of seven or more GPS satellites 106.

A second area 904 may have five or six GPS satellites 106 visible, and a third area 906 may have four GPS satellites 106 visible. Typically, the third area 906 represents the minimum limit for GPS coverage without experiencing potential problems.

An additional area representation (not shown) may be indicative of areas which have less than four GPS satellites 106 visible, and therefore would also indicate areas having reduced coverage. In these problem areas, pseudolites 108 may be added using techniques described above. The added pseudolites 108 may then be counted as additional GPS satellites 106, thus increasing the number of GPS satellites 106 visible in the area of coverage of the pseudolites 108, and thus further resulting in changes in the areas depicted in the terrain map 302.

Other aspects, objects, and features of the present invention can be obtained from a study of the drawings, the disclosure, and the appended claims.

What is claimed is:

1. A method for determining a desired position of a pseudolite at a site at a specified point in time, including the steps of:

dividing the site into at least two areas of coverage including a first coverage area and a second coverage area;

determining if the first coverage area is covered by at least one GPS satellite at the specified point in time;

determining if the second coverage area is covered by at least one GPS satellite at the specified point in time;

predicting an area of coverage of the site by at least one GPS satellite as a function of the determination of coverage of the first and second coverage areas at the specified point in time;

determining a condition of reduced coverage as a function of the predicted area of coverage at the specified point in time;

displaying the area having reduced coverage at the specified point in time on a terrain map;

placing a pseudolite at a location at the site to provide coverage in the area having reduced coverage at the specified point in time; and displaying an area of coverage of the pseudolite on the terrain map at the specified point in time.

2. A method, as set forth in claim 1, further including the step of moving the pseudolite to a new location in response to the area of coverage of the pseudolite not covering the area having reduced coverage at the specified point in time.

3. A method for determining a desired position of a pseudolite at a site at a specified point in time, including the steps of:

dividing the site into at least two areas of coverage including a first coverage area and a second coverage area;

determining if the first coverage area is covered by at least one of a plurality of GPS satellites at the specified point in time;

determining if the second coverage area is covered by at least one of the at least one of a plurality of GPS satellites and another one of a plurality of GPS satellites at the specified point in time;

predicting an area of coverage of the site by the plurality of GPS satellites as a function of the determination of coverage of the first and second coverage areas at the specified point in time;

determining a condition of reduced coverage as a function of the predicted area of coverage at the specified point in time;

displaying the area having reduced coverage at the specified point in time on a terrain map;

placing a pseudolite at a location at the site to provide coverage in the area having reduced coverage at the specified point in time;

moving the pseudolite model to a second location on the terrain map;

displaying a revised area of coverage of the pseudolite model on the terrain map; and displaying a revised change in coverage of the area having reduced coverage as a function of the revised area of coverage of the pseudolite model.

4. A method, as set forth in claim 3, further including the step of placing a pseudolite at a location at the site corresponding to a desired location of the pseudolite model.

5. An apparatus for determining a desired position of a pseudolite at a site, at a specified point in time, comprising:

at least one mobile machine located at the site;

a GPS receiver located on the mobile machine for receiving signals from a plurality of GPS satellites;

a display for indicating a terrain map of the site;
input means for inputting a desired location on the terrain map for a pseudolite model; and
a processor for:
dividing the site into at least two areas of coverage including a first coverage area and a second coverage area;
determining if the first coverage area is covered by the plurality of GPS satellites at the specified point in time;
determining if the second coverage area is covered by the plurality of GPS satellites at the specified point in time;
predicting an area of coverage of the site by the plurality of GPS satellites as a function of the determination of coverage of the first and second coverage areas at the specified point in time;
determining a condition of predicted reduced coverage in at least one area of the site at the specified point in time; and
providing information to the display to indicate the at least one area having reduced coverage at a specified point in time, the area having reduced coverage being indicative of a desired position of a pseudolite at the site.

6. An apparatus, as set forth in claim 5, wherein the processor is further adapted to receive the desired location for the pseudolite model, provide the desired location to the display to indicate the pseudolite model at the desired location, and provide information to the display to indicate an area of coverage of the pseudolite model.

7. An apparatus, as set forth in claim 6, wherein the processor is further adapted to provide information to the display to indicate a change in coverage of the area having reduced coverage as a function of the area of coverage of the pseudolite model.

8. An apparatus for determining a desired position of a pseudolite at a site, at a specified point in time, comprising:
at least one mobile machine located at the site;
a GPS receiver located on the mobile machine for receiving signals from a plurality of GPS satellites;
a display for indicating a terrain map of the site; and
a processor for:
dividing the site into at least two areas of coverage including a first coverage area and a second coverage area;
determining if the first coverage area is covered by the plurality of GPS satellites at the specified point in time;
determining if the second coverage area is covered by the plurality of GPS satellites at the specified point in time;
predicting an area of coverage of the site by the plurality of GPS satellites as a function of the determination of coverage of the first and second coverage areas at the specified point in time;
determining a condition of predicted reduced coverage in at least one area of the site at the specified point in time;
providing information to the display to indicate the at least one area having reduced coverage at a specified point in time, the area having reduced coverage being indicative of a desired position of a pseudolite at the site;
determining an optimal location of at least one pseudolite model as a function of the at least one area having reduced coverage; and providing information to the display to indicate the at least one pseudolite model at the optimal location, and to update the terrain map to indicate revised coverage in the at least one area as a function of the coverage of the plurality of GPS satellites and the at least one pseudolite model.

9. An apparatus for determining a desired position of a pseudolite at a site, at a specified point in time, comprising:
a remote site;
a display located at the remote for indicating a terrain map of the site;
input means at the remote site for inputting a desired location on the terrain map for a pseudolite model;
means for delivering the provided information from the remote site to the site; and
a processor located at the remote site for:
dividing the site into at least two areas of coverage including a first coverage area and a second coverage area;
determining if the first coverage area is covered by the plurality of GPS satellites at the specified point in time;
determining if the second coverage area is covered by the plurality of GPS satellites at the specified point in time;
predicting an area of coverage of the site by the plurality of GPS satellites as a function of the determination of coverage of the first and second coverage areas at the specified point in time;
determining a condition of predicted reduced coverage in at least one area of the site at the specified point in time; and
providing information to the display to indicate the at least one area having reduced coverage at a specified point in time, the area having reduced coverage being indicative of a desired position of a pseudolite at the site.

10. An apparatus, as set forth in claim 9, wherein the processor is further adapted to receive the desired location for the pseudolite model, provide the desired location to the display to indicate the pseudolite model at the desired location, and provide information to the display to indicate an area of coverage of the pseudolite model.

11. An apparatus, as set forth in claim 10, wherein the processor is further adapted to provide information to the display to indicate a change in coverage of the area having reduced coverage as a function of the area of coverage of the pseudolite model.

12. An apparatus for determining a desired position of a pseudolite at a site, at a specified point in time, comprising:
a remote site;
a display located at the remote for indicating a terrain map of the site;
means for delivering the provided information from the remote site to the site; and
a processor located at the remote site for:
dividing the site into at least two areas of coverage including a first coverage area and a second coverage area;
determining if the first coverage area is covered by the plurality of GPS satellites at the specified point in time;
determining if the second coverage area is covered by the plurality of GPS satellites at the specified point in time;

predicting an area of coverage of the site by the plurality of GPS satellites as a function of the determination of coverage of the first and second coverage areas at the specified point in time;

determining a condition of predicted reduced coverage in at least one area of the site at the specified point in time; and providing information to the display to indicate the at least one area having reduced coverage at a specified point in time, the area having reduced coverage being indicative of a desired position of a pseudolite at the site;

wherein the processor is further adapted to determine an optimal location of at least one pseudolite model as a function of the at least one area having reduced coverage, providing information to the display to indicate the at least one pseudolite model at the optimal location, and provide information to the display to update the terrain map to indicate revised coverage in the at least one area as a function of the coverage of the plurality of GPS satellites and the at least one pseudolite model.

* * * * *